(No Model.)
O. JENNESS.
CURRY COMB.
No. 360,301. Patented Mar. 29, 1887.
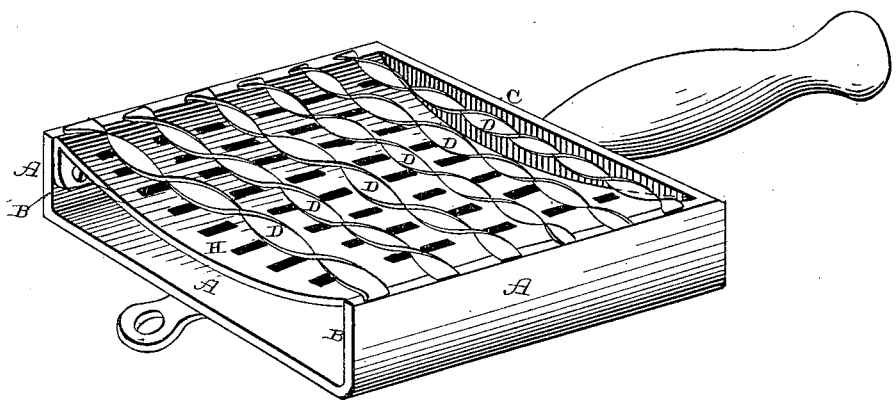
Fig. 1.
Fig. 2.
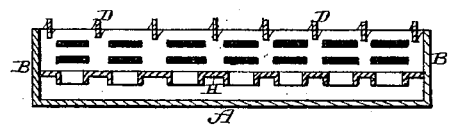
Fig. 4.
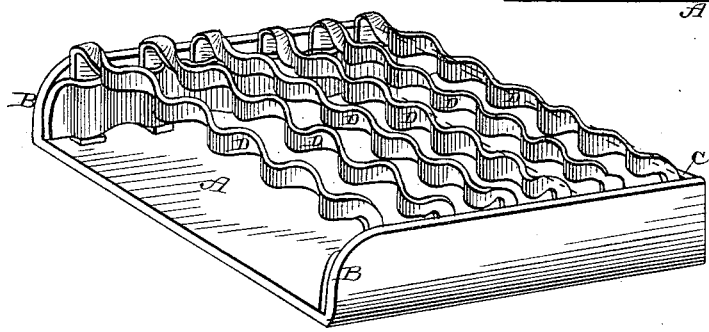
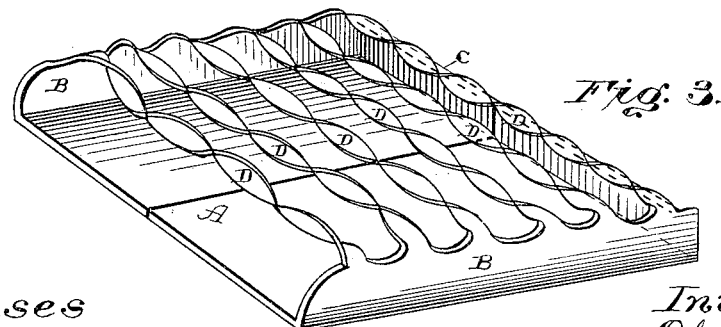
Fig. 3.
Witnesses
Wm. J. Janney
L. L. Burket
Inventor
Orlando Jenness
By J. A. Lehmann,
Attorney.

UNITED STATES PATENT OFFICE.

ORLANDO JENNESS, OF BOSTON, MASSACHUSETTS.

CURRY-COMB.

SPECIFICATION forming part of Letters Patent No. 360,301, dated March 29, 1887.

Application filed September 30, 1886. Serial No. 215,021. (No model.)

*To all whom it may concern:*

Be it known that I, ORLANDO JENNESS, of Boston, in the county of Suffolk and State of Massachusetts, have invented certain new and useful Improvements in Curry-Combs; and I do hereby declare the following to be a full, clear, and exact description of the invention, such as will enable others skilled in the art to which it pertains to make and use it, reference being had to the accompanying drawings, which form a part of this specification.

My invention relates to an improvement in curry-combs; and it consists in, first, a curry-comb in which the back and sides of the frame and the bars are formed in a single piece, the bars being stamped out and then twisted; second, a curry-comb in which the back, the two sides, and one end of the frame and the bars are all made from a single piece of metal, the bars being stamped out and then twisted; third, a curry-comb composed of a box-like frame, which is closed on the back, two sides, and one end, and the bars which extend across the frame, one end of the frame being left open to empty the dirt out; fourth, a curry-comb having a box-like frame, cross-bars which extend across the frame, for loosening the dirt from the animal's hide, and a perforated partition placed inside of the frame under the bars, all of which will be more fully described hereinafter.

The object of my invention is to provide a curry-comb in which the teeth are to be formed of either twisted or corrugated bars, which loosen the dandruff, dust, and dirt from the animal's skin without hurting or cutting it, as the teeth of an ordinary curry-comb will do, and to so construct the frame of a curry-comb that it will catch the dust and dirt, and thus prevent it from flying around in the usual manner.

Figure 1 is a perspective of one form of a curry-comb embodying my invention. Fig. 2 is a similar view showing another form. Fig. 3 is a perspective showing another form. Fig. 4 is a vertical section taken through the center of the curry-comb.

A represents the frame, which is made from metal of any kind, and which is provided with the two sides B and one end, C. The other end of the frame is left entirely open, so that the dust and dirt loosened from the animal's skin is caught within the box or frame, and can be freely emptied out. The comb while in use will always be held so that the closed end is downward, so as to catch the dust and dirt as it is loosened from the skin.

The teeth of the comb are formed by the bars D, which may either be twisted or corrugated and either formed separately from the frame, and then united thereto, or formed as a component part thereof, as may be desired. These bars extend across the frame, as shown, and act in the same manner as the teeth of an ordinary curry-comb, but without any danger of cutting or hurting the animal in any way. The edges of these bars can be sharpened to any desired extent, so as to loosen up the hair and the dust and dirt contained therein, which sharpening cannot be done where twisted wires are used together, as has been done heretofore.

Should it be desired to form the bars as a portion of the box-frame itself, instead of making them separately and then attaching them to the frame, a piece of sheet metal is taken and portions are stamped out or cut away, leaving bars in the frame of straight flat pieces of metal and separated suitable distances apart. These strips are then caught hold of at the center by any suitable tool and twisted into the shape shown. The frame is bent so as to form the two sides, one end, and the back. This method of manufacturing a curry-comb produces a very strong comb and one which it will be almost impossible to wear out.

When it is desired to hold the dust and dirt within the frame and prevent the dust from flying around while the comb is being used, a partition, H, may be placed inside of the frame, and this partition punched full of small holes, through which the dust and dirt will freely pass. The holes through this partition will be punched so as to have raised edges around them on the inside, to prevent the dust and dirt from passing back through the partition at any time. As fast as the dust, dirt, and dandruff is loosened from the animal's skin it passes through the partition into the box-like frame A, where it is held until the groom tilts the open end of the comb downward, when it instantly drops out.

A curry-comb provided with bars, instead of teeth in the usual manner, loosens the dust and dirt from the brush, and that without wearing or tearing the bristles, as teeth will always do.

Should it be desired, the comb can be produced by casting the plate with twisted or wrinkled bars and bending it to form the box-frame.

Having thus described my invention, I claim—

1. A curry-comb in which the back and sides of the frame and the bars are formed from a single piece of metal, the bars being stamped out and then twisted, substantially as shown.

2. A curry-comb in which the back, the two sides, one end, and the bars are formed from a single piece of metal, the bars being stamped out and then twisted, substantially as described.

3. A curry-comb composed of a box-like frame and bars which extend across the frame, the frame being closed on the back, two sides, and at one end, and open at the other end to empty out the dirt, substantially as set forth.

4. A curry-comb having a box-like frame, cross-bars for loosening the dirt from the animal's hide, and a perforated partition placed inside of the frame under the bars, substantially as specified.

5. A curry-comb composed of a box-like frame which is open at one end only and bent or twisted cross-bars, substantially as shown and described.

In testimony whereof I affix my signature in presence of two witnesses.

ORLANDO JENNESS.

Witnesses:
 ANDREW JAS. SMITH,
 CARROLL ROBBINS.